United States Patent

[11] 3,583,365

| | | |
|---|---|---|
| [72] | Inventor | Darrel G. Harden<br>1590 S. Oklahoma, Norman, Okla. 73069 |
| [21] | Appl. No. | 809,161 |
| [22] | Filed | Mar. 21, 1969 |
| [45] | Patented | June 8, 1971 |

[54] METHOD AND APPARATUS FOR HANDLING FISH
16 Claims, 1 Drawing Fig.

[52] U.S. Cl. .................................................. 119/3, 43/6.5
[51] Int. Cl. ...................................................... A01k 63/00, A01k 79/00
[50] Field of Search .......................................... 119/3, 5; 43/6.5; 214/12, 13, 14; 37/55

[56] References Cited
FOREIGN PATENTS
| 997,247 | 1/1952 | France |
| 32.029 | 5/1964 | Germany |

*Primary Examiner*—Hugh R. Chamblee
*Attorney*—Dunlap, Laney, Hessin & Dougherty ABSTRACT: Method and apparatus are disclosed for transferring live fish from one body of water to a retaining container and then to a second body of water. The method comprises flowing a stream of water containing entrained fish under a pressure differential into a retaining container where the fish are strained out and the water stream is removed continually. The fish are released subsequently from the retaining container by reversing the flow of water into and out of the retaining container. The apparatus comprises a container attached to one end of a conduit with the other end of the conduit immersed in the water body source of fish. Other conduit means are attached to the container as well as a pump so that water may be flowed from the container or into the container. A strainer is mounted over the outlet of the container and an air-release valve and aspirator are mounted near the top of the container.

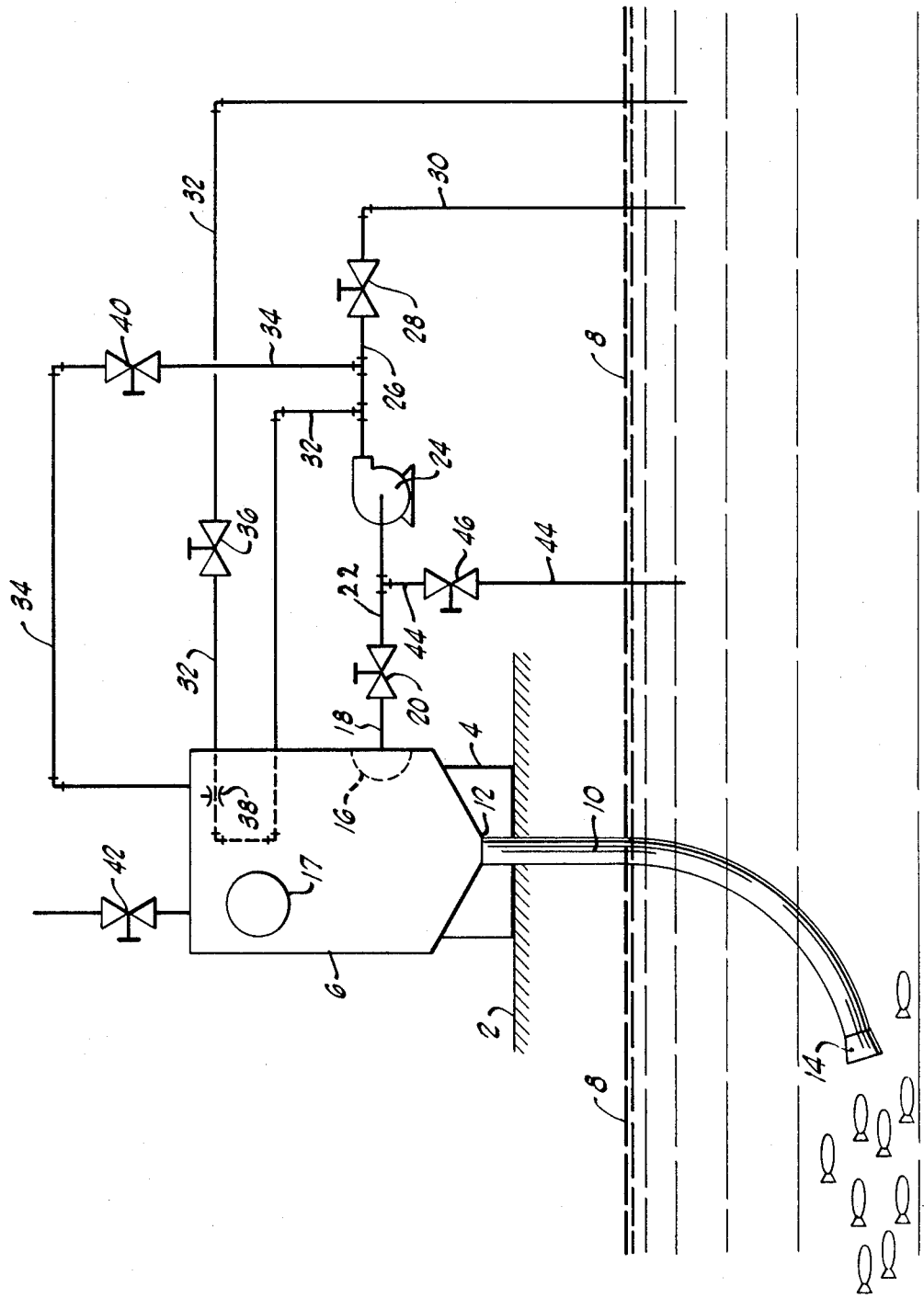

METHOD AND APPARATUS FOR HANDLING FISH

BACKGROUND OF THE INVENTION

1. Field of the Invention

This invention relates to method and apparatus for handling fish. More particularly it is concerned with method and apparatus for transferring the fish from one body of water to another body of water or other location.

2. Brief Description of the Prior Art

In the harvesting of foodfish, such as catfish, and in other operations requiring the handling of quantities of fish, it is desirable that the fish be maintained in as perfect a physical condition as possible. This is particularly true when the fish are later to be released in live condition into ponds, lakes, and rivers to grow and propagate. Fish are presently transferred in bulk from a retaining tank, purse seine, pond or similar source by the use of scoops which pick up the fish and dump them at a desired second location. This is a time-consuming operation resulting in damage and injury to some of the fish. More recently it has been proposed to transfer fish from one location to another by pumping a stream of water and entrained fish directly through the pump. This method also results in injury to the fish as they pass in contact with the moving parts of the pump.

BRIEF DESCRIPTION OF THE PRESENT INVENTION

It is an object of this invention to provide a more efficient method and apparatus whereby live fish may be concentrated in a container for transfer to another location.

Another object of this invention is to provide a method and apparatus for handling fish which does not damage or injure the fish.

Still another object of this invention is to provide a method and apparatus whereby a water pump may be utilized to move a stream of fish and water without direct contact between the fish and the moving parts of the water pump.

Although the further description of my invention makes frequent reference to a pond as the source of the fish, it should be understood that this limitation is made only for purposes of description and that my invention is equally applicable to removing fish from other sources, such as stock tanks, lakes, and the like.

Briefly stated my invention comprises method and apparatus for handling live fish whereby a stream of fish and water is caused to flow through a first conduit which has one end immersed in the pond from which the fish are to be removed and which has its other end attached to an enclosed, watertight container in which the fish are to be collected and retained. The pressure differential in the conduit is maintained primarily by a water pump intermediate a second conduit leading from the container. A strainer mounted within the container at its juncture with the second conduit strains out and keeps back the fish within the container while water flows from the tank through the strainer, the second conduit and the pump. As an aid to maintaining the necessary reduced pressure within the container, air is removed from the top of the container by an aspirator. When sufficient fish have been retained in the container, the fish are transferred to another container or released into a lake, pond or river by reversing the flow of water into the container and releasing a stream of fish and water from the container through the first conduit. A preliminary step to the process is filling the container with water and removing air displaced from the container.

BRIEF DESCRIPTION OF THE DRAWING

The accompanying FIGURE is a schematic drawing of one embodiment of my invention representing both the apparatus and method of the invention.

DESCRIPTION OF A PREFERRED EMBODIMENT OF THE INVENTION

Referring now to the accompanying drawing, reference numeral 2 denotes a foundation member which may be, for example, the bed of a truck, the hull of a ship, or other vehicle capable of transporting a container of water and fish. A support member generally designated at 4 supports an enclosed watertight container 6 in which fish from a pond 8 or other water-containing source are to be concentrated. Container 6 may be any sort of watertight enclosed structure having sufficient strength to withstand a pressure differential between its interior and the atmosphere. Optionally container 6 has mounted in its side a watertight glass port 17 for observing the concentration of fish within the container during operation. A flexible conduit member 10 is attached at 12 to the container 6 and is fitted with some means for closing the lower end of the conduit, such as the stopper 14 or butterfly valve or the like. The flexible conduit 10 is of a sufficient diameter to accommodate the flow of a stream of water and fish through it, and preferably is made of some flexible material such as rubber to permit its easy insertion into the pond 8 and other necessary manipulation.

Mounted within the enclosed container 6 is a strainer 16 of a suitable mesh size which rests over the juncture of container 6 and a conduit 18 which in turn is connected to valve 20 and the latter to conduit 22. Conduit 22 in turn connects to pump 24 which in turn connects to conduit 26, this to valve 28 and valve 28 to conduit 30. Conduits 32 and 34 connect to conduit 26 between the outlet of pump 24 and valve 28. Conduit 32 passes into and out of container 6 through watertight connections, and as shown in the FIGURE, has valve 36 mounted on it at some point intermediate the point where conduit 32 emerges from container 6 and the point where conduit 32 is immersed in the pond 8. An aspirator designated at 38 is mounted in conduit 32 in the portion of conduit 32 within container 6. Aspirators are well known devices for removing air from a vessel and are based on the principle of flowing a fluid, in this case water, past an orifice thus creating a partial vacuum behind the orifice.

Conduit 34 containing valve 40 mounted within it connects with container 6 at some point preferably, but not necessarily, near the top of the container 6. An air-outlet valve 42 is installed at or near the top of container 6. Conduit 44 bearing valve 46 intersects conduit 22 at a point intermediate valve 20 and pump 24.

Alternatively, conduit 34 need not be connected to container 6 as shown in the FIGURE but may be connected to intersect conduit 18 at a point intermediate valve 20 and container 6. In addition to making conduit 10 of some flexible material such as rubber, it will be desirable to make conduits 44, 30, and 32 of some flexible material to permit ease of handling.

In operation the container 6 is first filled with water. This is accomplished by inserting the stopper 14 in the end of conduit 10 and closing valves 20, 28, and 36. Valves 40, 42, and 46 are open. When pump 24 is activated, water is drawn by force of the differential pressure created from pond 8 through conduit 44, valve 46, conduit 22 and through pump 24. The waterflow then continues through conduits 26 and 34, valve 40 and into container 6. In the alternative arrangement noted above wherein conduit 34 is connected to conduit 18 water is flowed from conduit 34 into conduit 18 and back through strainer 16 into container 6. As container 6 fills with water, air is displaced from container 6 through valve 42. When container 6 is filled with water, valves 40, 42, and 46 are closed and the valve or stopper in conduit 10 is opened as are valves 28 and 36. The continued pressure differential created causes a stream of water containing entrained fish to flow through conduit 10 into container 6. Here the fish are retained in container 6 by strainer 16 and the water flows on through conduit 18, valve 20, conduit 22, pump 24, conduit 26, valve 28 and conduit 30. When sufficient fish have accumulated within container 6 as determined by inspection through port 17, pumping of water into and out of the container 6 is discontinued. During the step of filling container 6 with fish, a portion of the water leaving pump 24 by conduit 26 is diverted through conduit 32, aspirator 38 and valve 36 into some means of water disposal, such as pond 8. Through action of aspirator 38, any free air collecting in the top of the container 6 is removed during the process of collecting fish within container.

When the desired quantity of fish have been accumulated or concentrated in container 6, the next step is to release the fish to the desired second location which may be other retaining tanks, a lake, pond, river or the like. If the container 6, pump 24 and associated conduits and valves are mounted on a truck bed it is a simple matter to move the container 6 to the desired second location for release of the fish. With the container 6 at the second location, the flexible conduit 10 is immersed at its lower end in this second body of water and the lower end opened to the flow of water by removing the stopper 14 or opening a valve located there. In describing this step of the operation it should be assumed with reference to the figure that pond 8 is the body of water into which a concentration of fish in container 6 is to be released.

The lower end of conduit 44 is also immersed in this second body of water and valves 46 and 40 are opened. Valves 20, 36, and 42 are closed. Pump 24 is then activated so that water flows through conduit 44, valve 46, conduit 22, pump 24, conduit 26, conduit 34, valve 40 and into container 6. Simultaneously a stream of fish and water is released through conduit 10 into the second body of water. When all fish have been removed from the container 6 pumping is stopped and the container 6 is emptied of water by opening valve 42 so that air may enter the container 6 and water may drain from it by force of gravity through conduit 10.

I claim:

1. A method of transferring fish from a body of water into a closed container containing water and having a first inlet and a first outlet which comprises:

maintaining said first inlet and said first outlet in a closed condition;
   introducing a stream of water into a pump and pumping said stream of water from said pump into said closed container through a second inlet in said container;
   releasing air from said container through a second outlet in said container as the latter is filled with water;
   terminating the flow of said stream of water from said pump into said closed container when said container is filled to a desired extent with water;
   attaching said pump to said first outlet;
   closing said second outlet in said container;
   pumping a stream of water from said container through said first outlet and said pump, thereby reducing the pressure in said closed container;
   flowing a mixed stream of fish and water from said body of water into said container through said first inlet;
   straining said fish from said stream of fish and water;
   retaining said fish within said container; and
   pumping the residual stream of water from said container through said pump attached to said first outlet.

2. The method of claim 1 wherein prior to pumping water from said container through said first outlet, said container is filled with water by:

providing a valved conduit connecting said pump and said first outlet;
   maintaining said valved conduit in a closed position;
   maintaining said first inlet inlet in a closed position;
   introducing a stream of water into said valved conduit at a point intermediate the valve in said valved conduit and said pump;
   pumping said stream of water of from said intermediate point through said pump and into said container through said first outlet;
   releasing air from said container through a second outlet in said container as the latter is filled with water; and
   terminating the flow of said stream of water of from said intermediate point into said container when said container is filled to a desired extent with water.

3. In the method of claim 2 the additional step of aspirating air from said container during the last five steps of claim 1.

4. The apparatus of claim 1 and:

a sixth conduit having a portion of its length mounted within said container and connected at one end to said third conduit at a point intermediate said pump and the valve in said third conduit;
   an aspirator in the portion of said sixth conduit mounted within said container; and
   a valve in said sixth conduit.

5. The apparatus of claim 4 wherein said means for closing said first conduit is a stopper inserted therein.

6. The apparatus of claim 1 wherein said fourth conduit is connected at one end to said third conduit intermediate said pump and said valve in said third conduit, and at its other end to said second conduit intermediate the valve in said second conduit and the junction of said second conduit with said container.

7. The apparatus of claim 6 wherein said means for closing said first conduit is a stopper inserted therein.

8. A method of transferring fish from a first body of water into a second body of water comprising:

a. providing a closed container having a first outlet, a first inlet, and a second inlet;
   b. connecting a water pump to said outlet;
   c. pumping a stream of water from said container through said water pump, thereby reducing the pressure in said container;
   d. flowing a mixed stream of fish and water from said first body of water into said container through said first inlet;
   e. straining said fish from said stream of fish and water;
   f. retaining said fish within said container, while continuing to pump the residual water stream from said container in step (c);
   g. terminating the flow of fish and water into said container when a desired quantity of fish are accumulated in said container;
   h. pumping a stream of water into said container through said second inlet by means of said pump; and
   i. ejecting a mixed stream of fish and water through said first inlet of said container into said second body of water.

9. The method of claim 8 wherein prior to step (c) the container is filled with water by:

j. maintaining said first inlet and said second inlet of said closed container in a closed condition;
   k. introducing a stream of water into said water pump;
   l. pumping said stream of water from said water pump into said closed container through a second inlet in said container;
   m. releasing air from said container through a second outlet in said container as the latter is filled with water;
   n. terminating the flow of said stream of water of steps (k) and (l) when said container is filled with water; and
   o. closing said second inlet and said second outlet and opening said first inlet and said first outlet.

10. In the method of claim 9, the additional step of aspirating air from said container during steps (c) to (f).

11. The method of claim 8 wherein prior to step (c) the container is filled with water by:

p. providing a valved conduit connecting said water pump and said first outlet;
   q. maintaining said valved conduit in a closed position;
   r. maintaining said first inlet in a closed position;
   s. introducing a stream of water into said valved conduit at a point intermediate the valve in said valved conduit and said water pump;
   t. pumping said stream of water referred to in step (s) from said pump into said container through said first outlet;

u. releasing air from said container through a second outlet in said container as the latter is filled with water;

v. terminating the flow of said stream of water referred to in steps (s) and (t) when said container is filled with water; and w. closing said second outlet, opening said first inlet and changing said valved conduit to an open position.

12. In the method of claim 11 the additional step of aspirating air from said container during steps (c) to (f).

13. Apparatus for transferring fish comprising:

container means;

a first conduit connected at one end to said container means, said conduit being adapted to convey a mixture of fish and water to and from the container means;

a pump having an inlet side connected to said container means and having an outlet side;

means for preventing fish from passing from said container means to said pump;

conduit means connected to the outlet side of said pump; and a second conduit connected to the inlet side of said pump whereby water may be drawn from said second conduit by said pump and pumped into said container means via said conduit means.

14. Apparatus as defined in claim 13 wherein said conduit means comprises:

a first conduit connected between the outlet side of said pump and said container means;

a second conduit having one end connected to the outlet side of said pump; and valve means for alternately placing either the first or the second conduits of said conduit means in communication with said pump for receiving the discharge therefrom.

15. Apparatus for transferring fish from one body of water to another body of water comprising:

a closed, watertight container adapted to be filled with water;

an air-release valve connected to said closed container;

a first conduit connected at one end with said container, said first conduit being adapted to the flow therethrough of a mixed stream of fish and water;

means for closing said first conduit;

a pump having an inlet side and an outlet side;

a second conduit connecting said container to the inlet side of said pump;

a valve in said second conduit;

a strainer mounted within said container over said second conduit connection to the container;

a third conduit having an end connected with the outlet end of said pump;

a fourth conduit connected at one end to said container and at its other end to said third conduit;

a valve in said fourth conduit;

a fifth conduit connected to said second conduit at a point intermediate said valve in said second conduit in said pump;

a valve in said fifth conduit; and a valve in said third conduit.

16. Apparatus for transferring fish from one body of water to another body of water comprising:

a closed, watertight container adapted to be filled with water;

an air-release valve connected to said closed container for admitting air thereto when said container is evacuated;

a first conduit connected at one end with said container, said first conduit being adapted to the flow therethrough of a mixed stream of fish and water;

means for closing said first conduit;

a pump having an inlet side and an outlet side;

first conduit means connected to the inlet side of said pump;

means in said first conduit means for alternately placing said conduit means in communication with the interior of said closed container for receiving water therefrom, or in communication with a selected source of water other than said container;

a strainer mounted within said container in the path of waterflow from said container to said conduit means when said conduit means is connected to said container for straining water flowing through said conduit means to said pump; and another conduit having an end connected to the outlet end of said pump.